United States Patent [19]

Patterson

[11] Patent Number: 4,459,060
[45] Date of Patent: Jul. 10, 1984

[54] SAFETY SHEAR TOOL FOR FIBERGLASS SUCKER ROD

[76] Inventor: Bert D. Patterson, 2301 Maurice, Odessa, Tex. 79760

[21] Appl. No.: 310,516

[22] Filed: Oct. 13, 1981

[51] Int. Cl.³ .............................................. F16D 9/00
[52] U.S. Cl. ...................................... 403/2; 403/343; 403/288; 285/3
[58] Field of Search ............... 403/2, 343, 288; 285/3, 285/4, 5

[56] References Cited

U.S. PATENT DOCUMENTS

| | | | |
|---|---|---|---|
| 2,132,477 | 10/1938 | Hollyfield | 403/288 X |
| 2,889,162 | 6/1959 | Norris | 403/2 |
| 3,489,445 | 1/1970 | Kammerer | 403/343 |
| 4,003,669 | 1/1977 | Fenske et al. | 403/288 |
| 4,064,953 | 12/1977 | Collins | 285/2 X |

Primary Examiner—Cornelius J. Husar
Assistant Examiner—Joseph A. Fischetti
Attorney, Agent, or Firm—Marcus L. Bates

[57] ABSTRACT

A safety shear tool for series connection into a string of sucker rod, especially a fiberglass sucker rod, which includes two coacting members connected together to form a swivel means, and to also form a shear means, so that the tool acts as a weak link as well as a swivel means. The tool is series connected into the sucker rod string and preferably located near the bottomhole pump. When the pump malfunctions and causes the tension in the sucker rod string to increase to a value less than but close to the designed breaking strength of the sucker rod string, the members of the tool are released, one from the other, thereby parting the sucker rod at the tool rather than parting the sucker rod structure itself. The tool is easily reassembled for subsequent use downhole in the above described manner. The set tension at which the tool parts the rod from the pump is easily changed.

8 Claims, 7 Drawing Figures

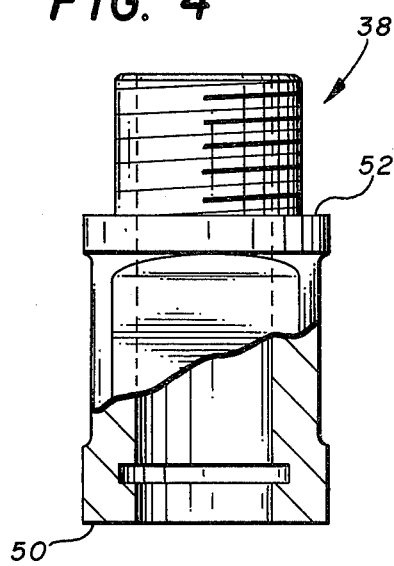
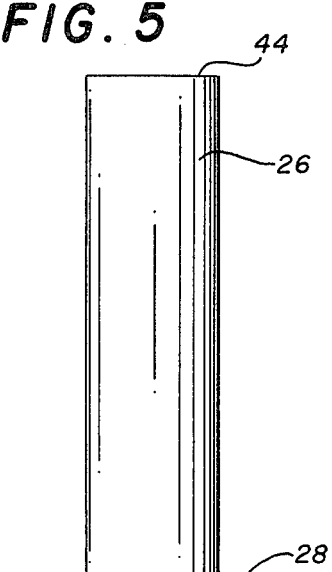
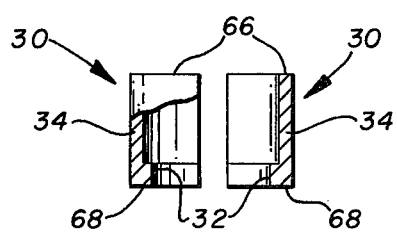
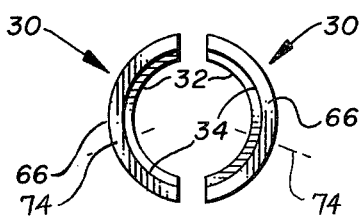
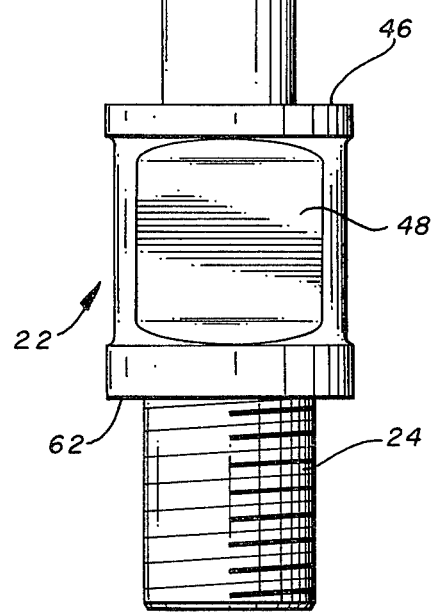

SAFETY SHEAR TOOL FOR FIBERGLASS SUCKER ROD

BACKGROUND OF THE INVENTION

Pumpjack units reciprocate a long string of sucker rod which in turn reciprocate a downhole pump. From time to time, for one reason or another, the pump will malfunction and place tension loads on the sucker rod string in excess of the breaking strength of the rod string. The overloaded rod string will part most anywhere between the polish rod and the downhole pump, wherever the weakest part of the rod string may be.

It is undesirable to subject a sucker rod string to excessive tension, whereby some weak point in the rod string parts, because the lower end of the rod string located below the break must be fished, which can be a very time consuming and expensive job. Furthermore, if the structural integrity of the entire rod string is sound, it follows that all of the parts of the entire string has been subjected to undue tension loads which renders subsequent use of the string questionable.

In recent years, steel sucker rods have sometime been replaced with fiberglass sucker rods. The fiberglass sucker rod string usually has exceedingly long joints which must be replaced in its entirety whenever one of the joints break, and for this reason, it is especially desirable to never subject the string of the fiberglass sucker rod to a tension force approaching the breaking strength of the individual joints.

It would therefore be desirable to provide a string of sucker rod with a safety shear tool which includes a shear member therein which fails and enables the tool to part whenever the sucker rod string is subjected to a predetermined tension which is less than the designed breaking strength of the rod string. A safety shear tool which achieves this purpose is the subject of the present invention.

SUMMARY OF THE INVENTION

This invention comprehends a combination safety shear tool and swivel for connection into a sucker rod string which reciprocates a downhole pump. The tool includes upper and lower members connected together by a shear member so that when the tool is subjected to a predetermined tension, the two members part, thereby preventing the rod string from being subjected to a tension force near its designed breaking strength.

The shear means which connects the two members of the present tool together preferably is in the form of a bisected cylinder having an inturned lip which engages a groove on one of the members in a manner such that when the lip is broken or sheared from the cylindrical skirt, the two members of the tool parts. The shear forces required to separate the tool can be accurately incorporated into the shear means by carefully choosing the amount of lip area included in the tool. This choice of lip area is easily achieved by removing material from each of the segments of the cylinder until the remaining material equals the breaking strength desired of the tool.

The lip and groove of the shear means enables the two members to function as a swivel, so that the two members of the tool are free to axially rotate respective to one another, thereby permitting the rod string to axially rotate respective to the downhole pump. The tool includes a seal means by which the internal parts thereof are maintained free of well fluids and debris.

Accordingly, a primary object of the present invention is the provision of a safety shear tool which includes a swivel means and enables a sucker rod string to swivel respective to a downhole pump; and, at the same time, provides a weak link of predetermined strength which prevents the sucker rod string from failing when the tension thereof exceeds a predetermined value.

Another object of the present invention is the provision of a combination shear means and swivel means for series connection into a string of sucker rod.

A further object of the present invention is the provision of a combination swivel means and shear means which are easily adjusted in the field to fail when the tool is subjected to a predetermined tension.

An additional object of the present invention is the provision of a safety shear tool having coacting opposed marginal ends series connected into a rod string and cooperating with one another in a manner whereby each of the members can be rotated axially respective to the other, with there being a shear means within the tool in the form of a keeper which is easily adjusted to fail at a predetermined tension value.

These and various other objects and advantages of the invention will become readily apparent to those skilled in the art upon reading the following detailed description and claims and by referring to the accompany drawings.

The above objects are attained in accordance with the present invention by the provision of a combination of elements which are fabricated in a manner substantially as described in the above abstract and summary.

BRIEF DESCRIPTION OF THE DRAWINGS

FIGS. 3-6 are longitudinal, part cross-sectional representations of the different parts of the tool disclosed in FIG. 2; and, FIG. 7 is an end view of the apparatus disclosed in FIG. 6.

DETAILED DESCRIPTION OF THE PREFERRED EMBODIMENT

Figure 1:
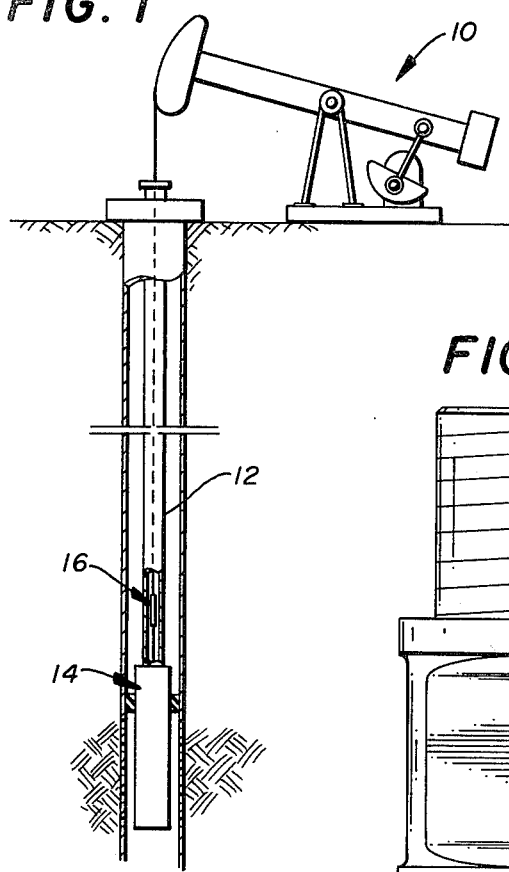
FIG. 1 is a diagrammatical representation of a downhole pump having apparatus made in accordance with the present invention associated therewith.
Figure 3:
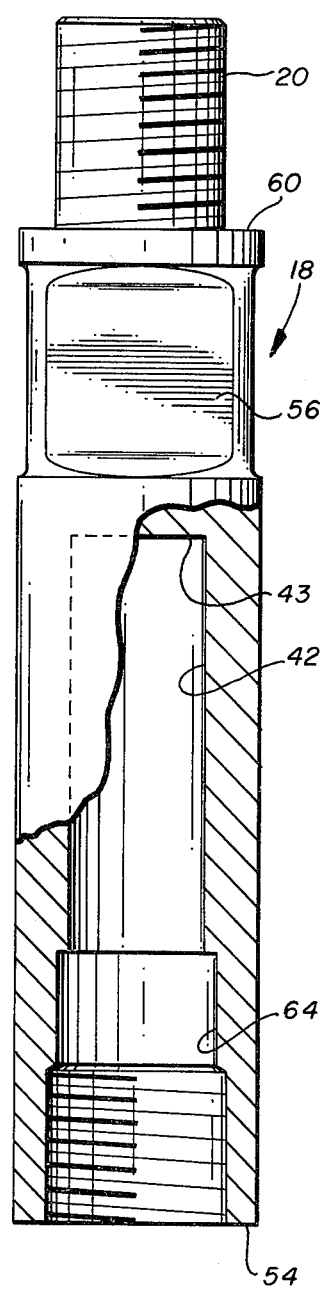

FIG. 1 of the drawings discloses a pumpjack unit 10 of conventional design which reciprocates a string of sucker rod 12 located downhole in the illustrated cased borehole. The rod string reciprocates a downhole pump, generally indicated by the numeral 14. A safety shear tool 16, made in accordance with the present invention, is series connected within the rod string and preferably is positioned in close proximity to the downhole pump 14.

Figure 2:
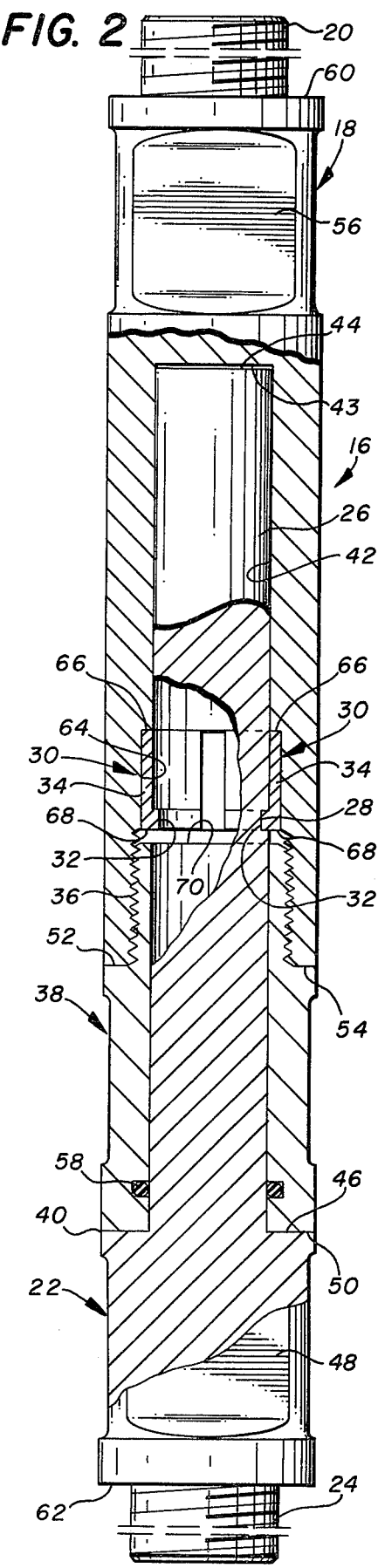
FIG. 2 is an enlarged, longitudinal, part cross-sectional illustration of a tool made in accordance with the present invention.

In FIG. 2, together with other figures of the drawings, the safety shear tool of the present invention is more fully illustrated. As particularly seen in FIG. 2, the safety shear tool 16 includes a first member 18 having a pin end 20 at the far or free end thereof. A second member 22 similarly includes a pin end 24 at the far or free end thereof. The pin ends 20 and 24 enable the tool to be connected in series relationship within a string of sucker rod, as for example, a string of fiberglass sucker rod which is provided with a suitable coupling for accommodating the pins 20 and 24. Where deemed desirable, a female threaded end, also called a box end, can be substituted for the threaded ends 20 and 24 so that the members 18 and 22 can be directly connected to the pin ends of adjacent joints of conventional sucker rod.

A mandrel 26, the details of which are set forth in FIG. 5, is an integral part of the second member 22 and extends in opposition to the pin end 24 thereof. The mandrel has a circumferentially extending groove 28 formed about a medial portion thereof. A shear keeper 30, the details of which are seen in FIGS. 6 and 7, has an inturned lip 32 removably received within the groove 28 of the mandrel. The lip 32 is an inturned integral part of a cylindrical skirt 34. The cylinder has been bisected to form a pair of segments of a circle. The interioral peripheral wall surface of the skirt member lies closely adjacent to the external peripheral wall surface of the mandrel in the illustrated manner of FIG. 2.

Threaded interface 36 threadedly connects the first member to a seal and jam sub 38, the details of which are more fully set forth in FIG. 4. As seen in FIG. 2, the jam sub terminates at interface 40. The jam sub is hollow and slidably receives a marginal length of the mandrel in close tolerance relationship therethrough in a telescoping manner.

The first member is provided with a blind passageway 42 which terminates at end wall 43. The mandrel has a terminal end 44 which is spaced from wall 43 when the mandrel is fully telescopingly received within the passageway 42.

Shoulder 46 is formed at one end of a wrench flat 48 of the second member. The last named shoulder abuttingly engages a complementary confronting shoulder 50 of the jam sub. Shoulder 52 of the jam sub abuttingly engages a complementary confronting shoulder 54 of the first member. The first member includes a wrench flat 56 opposed to the before mentioned wrench flat 48 for use in making up the tool into a rod string.

O-ring 58 is received within an o-ring groove formed in the illustrated manner within the jam-sub. Opposed shoulders 60 and 62 of the tool are formed inwardly of the opposed threaded marginal ends 20 and 24 for engaging complementary shoulders formed on coupling members for the sucker rod, in a manner known to those skilled in the art. A counterbore 64 is formed at the outer marginal end of passageway 42. The terminal end 66 of the skirt of the keeper loosely and abuttingly engages the illustrated shoulder formed at the end of the counterbore. The opposed end 68 of the keeper, which is in the form of a before mentioned lip, loosely and abuttingly engages the terminal end 70 of the jam sub, so that the keeper is captured in a journal like manner by the jam nut, first member, and second member.

The tool of the present invention preferably is connected within the rod string in the suggested manner of FIG. 1, and placed in close proximity of the downhole pump. The breaking strength of the shear keeper is adjusted by removing the keeper parts from the tool, and removing material from one of the segments thereof, so as to reduce the area of the lip which in turn permits the shear means to fail at a lower value. The amount of removed material can be accurately controlled to leave the desired amount of material in the segment which in turn causes the lip to shear from the skirt at any desired tension force.

The most common size fiberglass sucker rod string fails at approximately 16,000 pounds tension. The tool of the present invention can be made to fail at very accurately predicted tension forces by merely sawing a small segment from one or both of the larger segments of FIGS. 6 and 7. For example, the shear keeper is comprised of almost 360° of lip surface, and is made of an alloy designed to fail at 20,000 pounds. Assuming that the tool is required to separate at 12,000 pounds tension, it follows that $12 \div$ by $20 \times 360°$ is the physical size of the shear keeper which must be incorporated into the tool in order to meet these desired limitations. Accordingly, $8 \div$ by $20 \times 360°$ represents the size of a segment 74 removed from the shear means, or 72° from each segment.

An unexpected advantage of the present invention is the accuracy with which the tool can be set to fail. The tool can be accurately adjusted in the field. The tool, once it has failed, is easily placed back into service by merely disassembling the tool, removing the shear keeper therefrom, and replacing the keeper with the appropriate size member, and reassembling the tool in the illustrated manner of FIG. 2.

The advantages of the coacting members of the tool axially rotating with respect to one another assures that only tension forces are applied to the shear keeper, and that the rod string is not subjected to axial turning moments.

I claim:

1. A safety shear tool for connection into a rod string wherein the rod string reciprocates a downhole pump, comprising:

a first member having a far end for connection to a rod string, and a near end; a blind passageway formed along a longitudinal axial centerline of the tool which opens at said near end; a counterbore at the outer marginal end of the blind passageway;

a second member having a far end for connection to a rod string, and a near end; said second member includes a mandrel at said near end which is slidably received within said blind passageway;

a shear keeper;

said shear keeper includes two segments of a cylinder, each having an inwardly directed lip, with the cylinder wall being received within said counterbore; a groove formed in said mandrel for receiving said lip therein;

said segments each measure less than 180° and can be reduced in size to reduce the tension force required to shear the lip from the cylinder wall;

means by which the first and second members are connected together in a manner to rotate along the longitudinal axial centerline thereof respective to one another and to thereby form a swivel; whereby said shear keeper can be made of a size to fail at a predetermined tension and thereby allow said first member and said second member to part when the tool is subjected to the predetermined tension.

2. The tool of claim 1 wherein the outer marginal end portion of said counterbore threadedly receives a seal and jam member, said seal and jam member includes an axial passageway therethrough which slidably receives said mandrel, said seal and jam member capture said shear keeper within said counterbore.

3. The tool of claim 2 wherein seal means are formed about the interior of said seal and jam member for sealingly engaging the outer surface of the mandrel in a slidable manner.

4. The tool of claim 1 wherein the outer marginal end portion of said counterbore threadedly receives a jam member, said jam member includes an axial passageway formed therethrough which slidably receives said mandrel; said jam member captures said shear keeper within said first member.

5. The tool of claim 4 wherein seal means are formed about the interior of said jam member for sealingly engaging the outer surface of the mandrel in a slidable manner.

6. The tool of claim 1 wherein
   said cylinder is bisected along the longitudinal axial centerline thereof to facilitate assembly thereof to the mandrel and groove;
   the outer marginal end portion of said counterbore receives a jam member, said jam member includes an axial passageway therethrough which slidably receives said mandrel;
   seal means are formed about the interior of said jam member for sealingly engaging the outer surface of the mandrel in a slidable manner.

7. The tool of claim 6 wherein a fiberglass sucker rod string is connected to the far end of the first and second members, the lip of said shear keeper is of a size to shear when the tension placed on the first and second members is at a value which is less than the designed breaking strength of the fiberglass rod string.

8. A safety shear tool for connection into a rod string wherein the rod string can reciprocate a downhole pump, comprising:
   said tool has a longitudinal axial centerline which coincides with the longitudinal axis of a rod string when said tool is connected thereto; said tool includes a first member having a far end for connection to a rod string, and a near end; a blind passageway formed within said first member along the longitudinal axial conterline thereof which opens at said near end; a counterbore formed at the outer marginal end of the blind passageway;
   said tool further includes a second member having a far end for connection to a rod string, and a near end; the marginal near end of said second member is in the form of a mandrel which is slidably received within said blind passageway;
   a shear keeper in the form of a segment of a cylinder, said cylinder has an inside diameter made complementary respective to the outside diameter of said mandrel, said cylinder has an outside diameter made complementary respective to the inside diameter of said counterbore, said cylinder has a circumferentially extending inturned lip;
   a groove formed about the mandrel which is of a size to receive said lip therewithin;
   a jam sub said jam sub is slidably received aout said mandrel and threadedly engages the near marginal end of said first member; said jam sub, said mandrel, and said first member capture said shear keeper within said counterbore and groove whereby the first and second members can rotate along the longitudinal axial centerline thereof respective to one another to form a swivel, and said shear keeper can be made of a size to fail at a predetermined rod string tension and thereby allow said first member and said second member to part when the tool is subjected to the predetermined tension.

* * * * *

UNITED STATES PATENT AND TRADEMARK OFFICE
CERTIFICATE OF CORRECTION

PATENT NO. : 4,459,060
DATED : July 10, 1984
INVENTOR(S) : BERT D. PATTERSON

It is certified that error appears in the above—identified patent and that said Letters Patent is hereby corrected as shown below:

Column 6, line 19, insert a semicoln after "sub", first occurrence; and correct the spelling of "about".

Signed and Sealed this

Fourth Day of December 1984

[SEAL]

Attest:

GERALD J. MOSSINGHOFF

Attesting Officer

Commissioner of Patents and Trademarks